United States Patent [19]

Swanke et al.

[11] 3,829,720

[45] Aug. 13, 1974

[54] MOTOR STATOR

[75] Inventors: Roy L. Swanke, Newington; Robert M. Leonard, West Simsbury, both of Conn.

[73] Assignee: Dynamics Corporation of America, New York, N.Y.

[22] Filed: Jan. 26, 1973

[21] Appl. No.: 326,578

Related U.S. Application Data

[63] Continuation of Ser. No. 52,827, July 7, 1970, abandoned, which is a continuation-in-part of Ser. No. 858,906, Aug. 14, 1969.

[52] U.S. Cl.................. 310/43, 310/216, 310/217, 310/266
[51] Int. Cl. ............................................. H02k 1/04
[58] Field of Search ....... 310/97, 215, 86, 259, 217, 310/216, 218, 4, 260

[56] References Cited
UNITED STATES PATENTS 3,027,475   3/1962   Gaudry.............................. 310/260

3,230,402   1/1966   Nightingale et al................. 310/4 X

FOREIGN PATENTS OR APPLICATIONS 759,960   10/1956   Great Britain....................... 310/43

Primary Examiner—D. F. Duggan
Attorney, Agent, or Firm—Harbaugh & Thomas

[57] ABSTRACT

A laminated motor stator for an electric motor is provided with plastic molded-in-place end shrouds and selected electrically insulated surfaces along with interconnecting structural elements holding the laminations of the stator together as a unit and providing selected electrically insulated surfaces and a smooth rounded support for the field coil windings with a calculated yield to reduce tension on the inner winding turns by the outer winding turns. A method of forming the unified and insulated stator is also disclosed in which winding tension on the field turns is reduced and the coils are supported and held firmly in place.

8 Claims, 10 Drawing Figures

INVENTORS:
ROY L. SWANKE
ROBERT M. LEONARD
By Harbaugh & Thomas
Attorneys

MOTOR STATOR

CROSS REFERENCES

This application is a continuation of application Ser. No. 52,827, filed July 7, 1970, now abandoned, which in turn was a continuation-in-part of application Ser. No. 858,906, filed Aug. 14, 1969. Application Ser. No. 219,914, filed Jan. 21, 1972, is a division of said application Ser. No. 52,827, now abandoned.

BACKGROUND OF THE INVENTION

It is known in the art to provide electrical insulating spools for field coils which are two separable pieces each being of a particular shape and having outwardly projecting edge portions with spaced ribs and associated grooves, and including a tongue member for the interfitting of the two pieces into a motor housing for a small electrical appliance like a shaver. Other coil forms are known having tubular bodies with wide flat end flanges about which the field coils are formed by winding. Numerous types of bobbin and pole construction are used with and without air cooling grooves, etc. Coil guard forms are used to affix to the winding slots of the laminated stator discs so that the field coil winding loops are guided into place.

The normal method of forming a stator for a motor is to stack a selected number of die-cut ferrous plates or laminations to provide the desired tubular configuration to form the core of the stator with the laminations held together by metal rivets. The laminations as known in a two-pole form of stator provide inwardly depending arcuately lobed pole portions in which arcuate terminal edges when stacked, define longitudinal coil-receiving recesses and arcuate para-magnetic surfaces receiving the rotor with minimal tolerance between them to complete the motor. As shown in the co-owned Swanke U.S. Pat. No. 3,378,711 patent outer plates are provided on each end of the stacked laminated assembly having additional arcuate shrouds, extending axially as continuations of the arcuate surfaces of the intermediate laminations, which serve as rigid supports for the field coil turns at either end of the stack and accommodate the coils in the recesses behind each side of the arcuate surfaces. The field winding surfaces of square ended stators may be protected by split spool insulation inserts as shown in Jepson U.S. Pat. No. 2,662,194.

Prescribed turns of plastic coated copper wire are then wound under tension over the arcuate flange at one end, through the stack in one recess, over the arcuate flange at the other end and back through the stack in the other recess to form each half of the field of two coils. The insulation provided between the windings and the stator core is either too thin for dielectric longevity under winding tensions or too thick for optimum magnetic flux inducement.

Once the field coil wires have been wound they must have their ends hand-taped, strapped or twisted to prevent unraveling of the wire and retain the ends in proper position for completion of the electrical connections of the motor.

Due to the shearing action of the dies when cutting the laminations, the core that is formed when they are stacked has sharp and rugged edges at one end around the field coil receiving spaces and any spraying with a protective insulating coating to cover these edges and prevent the plastic coatings of the field coil wires from being pierced still does not adequately protect the thin-coated wire against the sharp sheared edges left by the punches because liquid tends to shed away from sharp edges. The plastic coatings are random and, even with electrostatic coating they are imperfect. The edges are often too sharp or jagged to be adequately covered by the thin plastic film without repeated coatings and drying and difficulty is experienced in eliminating the short circuiting of the field coil to the core under heavy load heat-up of the stator at those places where the wires contact the edges. Once such a short circuit develops the stator becomes inoperative and it or the assembled motor becomes dangerous. Also, labor costs are too high to re-work these pieces even if they are still in the production stages.

The insertion of fish paper insulation between the adjacent part of the opposite coils on each side of the arcuate flanges to insure that the field coils remain in place is done by hand and adds greatly to the labor and material costs of production. The instant invention overcomes these and related difficulties by providing a molded plastic insulator and combined plastic arcuate flange or shroud arrangement which serves several purposes, reduces the costs of the stator and prolongs its life.

SUMMARY OF THE INVENTION

In accordance with this invention the stack of pre-cut para-magnetic metal laminations constituting the stator core, less the end plates having the arcuate shrouds as shown in Swanke U.S. Pat. No. 3,378,711, is compressed and with a dielectric plastic is molded into a unified stator wherein a layer of plastic of predetermined dielectric properties, preferably slightly resilient and capable of elastic memory, completely covers the coil contacting core surfaces and corners with great uniformity and predictability in production. In the same molding operation pairs of spaced arcuate plastic shrouds are preferably formed, slightly diverging at a calculated angle from the axis of the stator and as integral elements of the assembly, at each end to guide and receive the field coil turns. As the field coils are wound in place their tension is relieved by the calculated inward movement of the shrouds to approximately a cylindrical orientation which relieves the winding strain yet clears the insertion of an armature. Thereafter the shrouds are stable in their imposed orientation as held by the windings against any elastic memory recovery and, in turn, the exposed end turns of the field coils are held firmly in place.

At the same time of molding, the outer mounting grooves of the laminated plates where the stator contacts the housing are filled also with plastic to provide means so that the stator can be readily and firmly mounted in a sound deadening and electrically insulated relationship in its outer housing. Matching longitudinal bore holes of the plates, which normally would contain rivets, are pack-filled with plastic in the operation whereby the rivets are eliminated and the wires are set enough to assist in holding the laminations in place against undue strains. The stator is made starting with a loose stack of laminations and ending with a totally unified structure in a single injection molding step ready for winding with great dielectric constancy and stability. Not only is magnetic inductance between coils and core improved, but the stator is more durable as integrated by adjacent laminations being secured to each other by the plastic filling irregularities in stamped openings through the core thickness for great integrated strength. Suitable upstanding end support walls are provided on the integral arcuate shrouds to positively lock the outer field coil loops in the place.

DESCRIPTION OF THE DRAWINGS

Illustrative embodiments of the invention are shown in the drawings wherein.

THE PREFERRED EMBODIMENT

Figure 1:
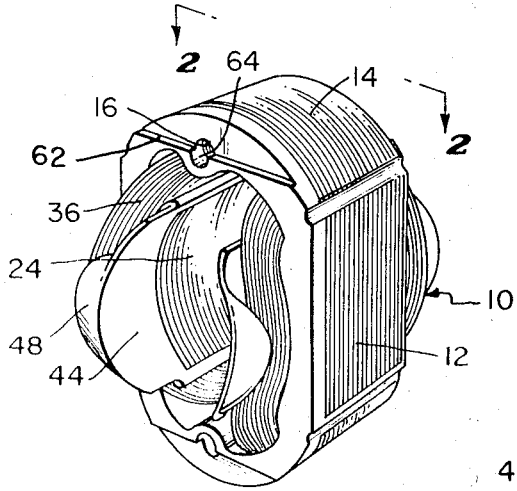
FIG. 1 is an end perspective view of a stator or field structure formed in accordance with this invention.
Figure 2:
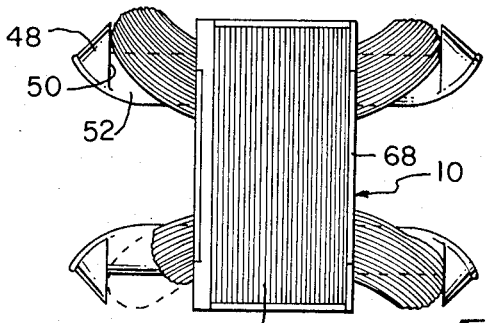
FIG. 2 is a side plan view taken upon the lines 2—2 of FIG. 1 with a portion of the loops of one of the field coils cut away to show the smooth arcuate form of the integral shrouds.
Figure 3:
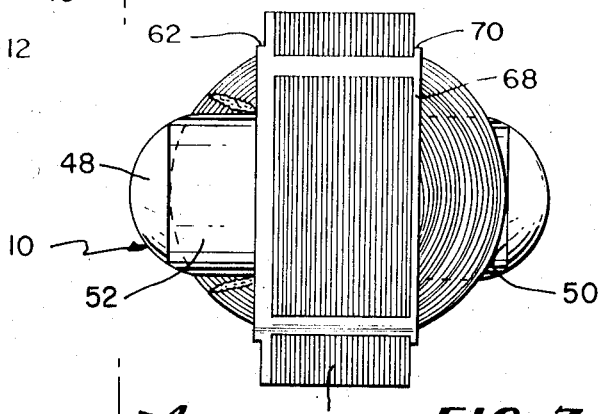
FIG. 3 is a top plan view of the stator of FIGS. 1 and 2.
Figure 4:
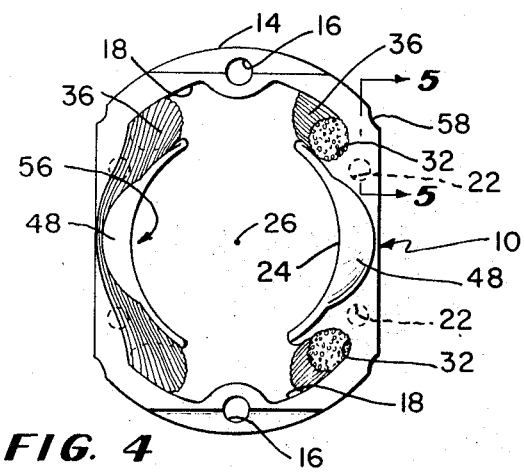
FIG. 4 is an end view partly in section taken from attitude of the lines 4—4 of FIG. 3.

Referring to FIG. 1 there is shown a stator 10 embodying the invention comprising a stack of identical die-cut paramagnetic field core laminations 12 each having their arcuate outer edges 14 provided with mounting holes 16 through them for alignment and securement. Symmetrical cut out portions 18 (FIG. 4) provide lobe-like pole sections 22 having notches 32 in their opposite edges to accommodate the field coils 36 while the inner edges are cut away to provide inwardly exposed arcuate edges 24 defining a circular form about the rotor axis indicated at 26. Other openings such as rivet holes 20 are provided adjacent to the bases of the pole sections and when the laminations are stacked the respective holes and pole sections are in axial alignment. The arcuate edges 24 provide a cylindrical-shaped space 56 that receives the rotor (not shown) with close running clearance when the motor is assembled, and the aligned notches 32 provide recesses which receive the wire turns of the field coils. The laminations 12 are stacked to any desired thickness to form the field stator core structure.

Figure 7:
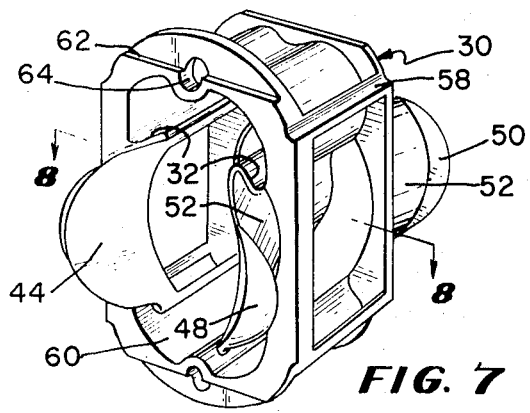
FIG. 7 is a perspective view of the plastic core of FIG. 1 as it would appear with the laminated sheet metal parts omitted.

A plastic covering 30 shown in FIG. 7 is injection molded about and intimately into every contour of the surfaces and crevices of the stack of laminations 12 while they are under compression and the covering 30 is also molded around the elongated recesses 32 which receive the field coils 36 and the unreamed apertures 20 to hold the laminations together. The surfaces of edges 24 are left bare of any plastic covering since these portions merely conduct the magnetic flux and do not bear electrical current. Bareness of these areas helps to dissipate heat for cooling purposes as well as intimate spacing for magnetic flux effectiveness.

Figure 8:
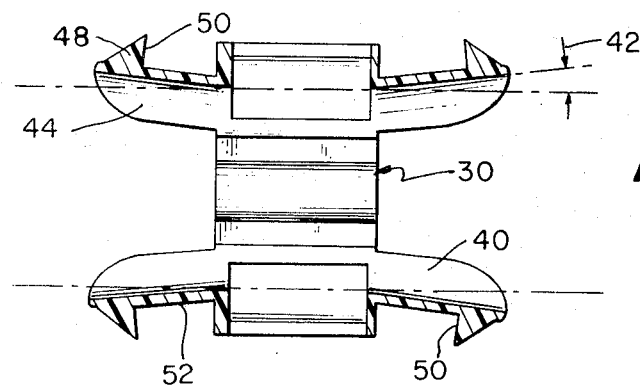
FIG. 8 is a diametrical sectional view taken longitudinally on line 8—8 in FIG. 7 showing the preset divergence of the shrouds before the field coils are wound thereon.
Figure 9:
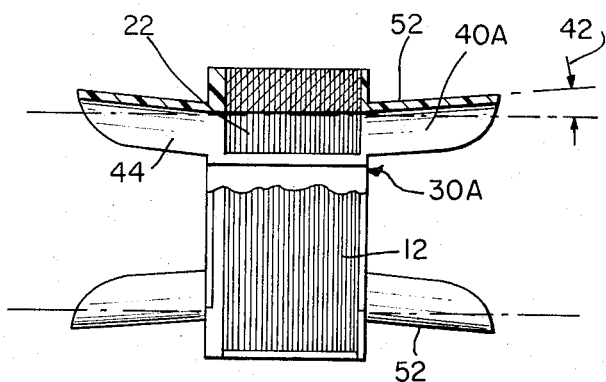
FIG. 9 is a sectional view like FIG. 8 showing an embodiment of the invention but along with the paramagnetic metal core in place in which terminal end stops are omitted from the shrouds.

Integral with the plastic covering 30 and as part of the stator field structure 10 are formed arcuate shrouds 40, 40A and 40B that are internally substantially cylindrical as at 44, which as shown in FIGS. 8 and 9 diverge outwardly diametrically as indicated at 42 as later explained.

In FIG. 9, the shrouds 40 have a plain end while in FIGS. 1 and 8 the shrouds 40A each have an integral upstanding reinforcing shoulder stop 48 with an inner flat wall 50 serving to retain the wire coils 36 in place. Each shroud 40A thus has the recessed arcuate outer surface 52 to receive and support the field coil end turns during the machine winding operation.

The plastic material of the shrouds 40 is preferably a thermoplastic having substantial rigidity with slight resiliency and an elastic memory whereby they may be displaced from a calculated diametrically diverging molded orientation by the winding tension on the field coils which is quite strong to snug the turns to the illustrated position in which their inner circular surfaces 44 are oriented co-cylindrical with the arcuate edges 24 of the laminations so that the rotor can be inserted between them.

This shroud displacement has several advantages which include the ability to wind the coils with a selectable feed tension that may be greater than conventionally used to better nest the turns without electrically shorting the turns at the bends; the shrouds progressively flex enough under winding tensions to relieve tensions on earlier turns as later turns are added, any final tension existing being that of the last turns whereby substantially no tension exists in the inner turns against insulated supporting structure and the outer turns against supporting structure and the outer turns are kept snugly tight; the shroud incline not only serves favorably in guiding the windings into proper place, but the heavy resilience and elastic memory, if heat is involved, maintains tension on the outer turns of the wire so that the stator does not deteriorate with respect to tension, position, heat exchange and flux pattern. The interior circular surfaces 44 of the shrouds encompass and are spaced from the rotor, and with an axial flow of cooling air the shrouds serve as vanes to direct it effectively rather than permit ineffective turbulence.

Figure 10:
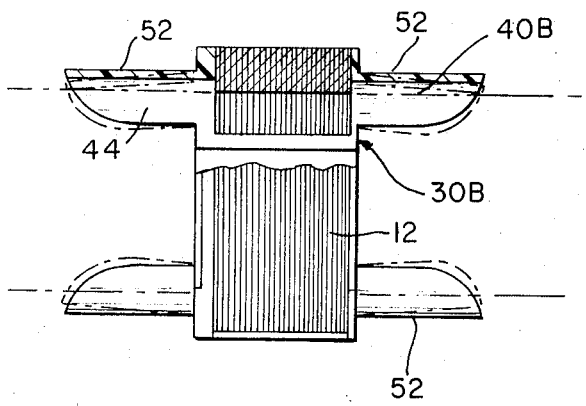
FIG. 10 is a sectional view like FIG. 9 showing another embodiment of the invention in which the shrouds are offset radially outwardly so that the ends can yield inwardly.

In FIG. 10 the shrouds 40B are disposed radially outwardly a spaced distance from the cylindrical surfaces 56 whereby their ends move under winding tension to the level of the surfaces 56 with the same advantages discussed. This construction has some advantages in simplifying molding die construction since it enables an axial pull away of the molding dies.

The plastic cover 30 is formed intimately about the stator poles, in such a manner as to include, as desired, any and all surfaces subtending field coil turns and include the cut-out corners 18 which forms the apertured ribs 58 therealong. Also the inner convolutions 60 of the stack 12 are filled and coated with a "layer" as distinguished from a "film" of plastic and also the structural edges 62, the holes 64 for mounting screws are similarly formed in the core to coincide with the aligned rivet holes 20 of the laminations to receive a mounting bolt as desired. Even the back side of the stack of plates 12 is covered with an insulating layer of plastic 68 and includes the provision of structural edges 70, as desired. Thus the outer configuration as well as the inner configuration of the plastic covering can be made to cover or provide structural elements for the stator 10 and its support in its outer housing (not shown).

Figure 5:
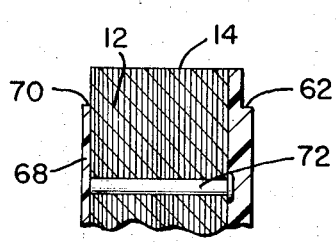
FIG. 5 is a fragmentary cross-sectional view taken along the lines 5—5 of FIG. 4 showing one form of the stator in which an internal rivet is used to hold the stack of laminated core members together.
Figure 6:
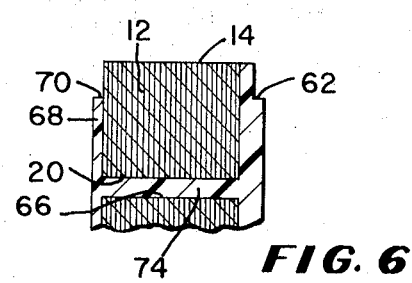
FIG. 6 is a fragmentary cross-sectional view taken along the lines 5—5 of FIG. 4 wherein the internal rivet has been omitted and the aligned rivet holes filled with plastic to hold the assembly together.

Preferably, integral plastic rod-like portions in rivet holes 20 are employed to hold the laminations together, but where the stack is secured with a metal rivet 72 before being placed in the mold, the rivet heads are covered. Otherwise double-headed pins can be used imbedded as shown in FIG. 5. In the preferred embodiment the plastic instead of the metal rivet is used. The laminations are clamped together in the mold or held by the mold itself and the rivet hole is tightly filled with plastic serving as a radially tight rivet 74 as shown in FIG. 6 which prevents any relative movement that might otherwise cause a fracture.

The shoulders 48 on the shrouds not only retain the coils 36 thereon, but function as transversely rigidifying members for the shrouds so that there is no tendency for them to flatten inwardly as they move under the pressure of the machine wound coils to position the cylindrical internal contour 44 shown. The plastics used to form the core 30 preferably have sufficient rigidity and strength so that the shrouds 40 and the shoulders 48 establish substantially true cylindrical orientation after the coils 36 are wound thereon.

The wires forming the coils 36 are plastic coated. One of the principal points in previous designs of stators where breakage of this coating occurred is indicated at the corner or edges 32 (FIG. 4) where the wires bend around and up over the outside of the shroud. By covering this part with an integral layer of cast and rounded plastic, this problem is eliminated.

The plates 12 are formed from any suitable paramagnetic material such as low carbon steel or iron and have sufficient structural stability to form a rigid compact field structure and serve as the medium in which the magnetic field to operate the motor is induced and conducted around the rotor. The stator 10 can be formed in any desired size for motors having a wide range of horse powers.

It is apparent from this description that the steps necessary to form the unified field structure 10 have been reduced over the prior art procedures and the field structure so produced has been improved. In carrying out the method of this invention it is only necessary to form a mold having the required internal spacial configuration and place therein the stack of plates 12 in properly aligned position. One or more rivets 72 may be used to hold the stack of plates in position or a temporary clamp can be used for this purpose. The mold itself can readily be designed to hold and clamp the assembly. Suitable molds having the required external and internal surfaces therein to define selected spaces about the field structure are used to contain the assembly. A selected plastic is then introduced by injection into the mold cavity around and inside the plates under conditions to form the covering 30 thereabout. Internal male or female contour mold portions are provided which project within the mold cavity, as is known in the art, to provide the plastic core as shown in FIG. 7, to exclude plastic from the internal convolutions of the plates to form the shrouds and the recesses 32, and to maintain the openings 64 where desired.

Plastics or mixtures having excellent structural properties, tensile strength, hardness, rigidity, etc., and also excellent electrical properties, such as low dissipation factors and acceptable dielectric constants, good dielectric strength and good volume resistivity, which properties prevail over a wide range of frequencies, and up to temperatures of 250°F, or higher, and which lend themselves to molding in intricate forms are used to form the stator of this invention and in carrying out the method of this invention. Plastics having good long term strength are preferred. Examples of suitable plastics are acetal homopolymer resins, parylene polymers, phenolics, polyallomers, polyethylene resins, acrylics and the like. Various fillers can be used to augment the desired properties of the plastics. To determine the suitability of any plastic as an insulator the electrical resistance properties are determined by the test procedure known as ASTM D257, ASTM D150-647, ASTM D495-61, and related tests.

An aspect of this invention is the formation of a plug or core of plastic 74 through the aligned "rivet" holes of the laminate structure wherein the plastic fills all irregularities, interstices and spaces along the entire length of the "rivet" holes so that each metal laminate forming the stack is held directly to the neighboring laminates in the series. By using the proper plastic composition having a mold (linear) shrinkage in./in, of 0.001 to zero, the total retention of the plastic-metal combination is maintained in the molded product. Several members of known plastics having the required low mold shrinkage and desired post-shrinkage properties may be used. Moreover many of the plastics used can have their mold shrinkage and post-shrinkage properties reduced by the use of glass fiber and mica fillers and the like. ABS resins containing 20–40% glass fibers exhibit mold shrinkages of 0.001 in/in or less, for example, while the unfilled ABS has a mold shrinkage of 0.004 in/in. Melamine-formaldehyde with glass fiber exhibits a mold shrinkage of 0.001 which is satisfactory for proper retention. A rivet hole plug will tighten longitudinally about 0.001" while diametrically will not loosen with less than 0.00025" shrinkage.

Glass-filled nylons are borderline as far as gaining full retention in the interior of the laminate structure while glass-filled polycarbonates or polyphenyline oxide exhibit excellent or low mold shrinkage in the order of 0.0001 in/in, and glass filled polystyrene at 0.001 in/in mold shrinkage is suitable. Certain plastics, such as thermosets exhibit post-shrinkage due to temperature and humidity extremes and the selection of this kind of plastic is not encouraged without some testing and formulation considerations prior to use. Wood flour fillers are highly suitable for purposes of extending the desirable properties of plastics. Glass fibers also assist against field coil wire turns embedding in the plastic covering.

Such plastics as alkyds, alkyls, chlorinated polyethers, methylpentene, polypropylene, polycarbonates and the like, having good electrical properties lend themselves to formulations with or without fillers, suitable for purposes of this invention. Some plastics which require chromium plated molds, or have other characteristics such as poor stress-strain properties, or are suitable only for thin-walled structures, can be formulated by known methods to avoid these drawbacks, while taking advantage of their other desirable properties, such as resistance to water chemicals or extreme atmospheric conditions.

The unitized stator is made standing with a paramagnetic metal field core structure preferably by cutting and stacking laminations having pole portions laterally axial defining recesses to receive field coils in supported relation around the poles and concave diametrically spaced internal cylindrical surfaces defining a space for receiving an armature. The field core structure is then supported and clamped in a mold having convex surfaces defining narrow spaces around the recesses and providing convex internally cylindrical surfaces defining shroud forming spaces at the axial ends of said pole portions. The convex internally cylindrical surfaces on opposite poles portions are diametrically spaced a distance from each other greater throughout the major portion of their length than the spacing of the concave cylindrical internal surfaces on the pole portions which are maintained bare of plastic by the mold.

A thermo plastic insulating material having slight resiliency and elastic memory is then injected into the spaces between said surfaces under conditions to form a unitary rigidified plastic covering having selected insulating surfaces and supporting structural surfaces conforming to said spaces and shroud cavities extending from said pole portions with their outer ends spaced radially outwardly from said cylindrical surfaces. The core thus formed can be inventoried without depreciation and when desired is wound with field coil wire turns in the recesses and over said shrouds under heavy tension to snug the turns and draw with the outer windings the ends of the shrouds radially inwardly to a distance spaced approximately the same as the diameter of the concave armature receiving cylindrical surfaces of the pole portions and relieve the tension on windings in contact with the covering on said pole portions.

From this description it is apparent also that the stator of this invention includes a paramagnetic field structure and a rigid electrically insulating cover structure molded in situ about the field structure characterized by providing selected electrically insulated surfaces and supporting structures thereon. The stator has a generally annular configuration to receive a rotor which may be defined by appropriate recesses or inwardly depending flanges with arcuate edges to encompass the rotor and also define recesses to receive the windings of the field core. By in situ extension of the plastic core structure into the recesses and through the aligned bore holes of the field structure the stator is given structural unity and rigidity. More than a pair of shroud members can be used, at each end of the stator, although normally a pair of said shroud members at opposite ends would be used to support a single field coil wound therearound. Also the transverse shoulder members 48 though providing the required rigidity to the shroud member 42 and preventing its collapse about the rotor cavity, need not actually support or retain the coil windings in the finished stator. These shoulders are present to prevent a winding from being displaced about the end of the shroud member during the winding process or after the dynamo-electric machine is assembled. Furthermore these transverse shoulder members and their sloping outer walls 48 can function as guides during the coil winding process to insure that each winding goes into place.

What is claimed is:

1. A stator for a dynamo-electric machine comprising:
   a. a paramagnetic field core structure of stacked laminated sheet metal layers having aligned holes and arcuate lobed poles inwardly defining a cylindrical surface of revolution larger than a rotor to be received between them and each pole defining internal longitudinal recesses along its sides interconnecting its ends;
   b. an integral dielectric cover structure of resilient thermoplastic material capable of an elastic memory molded in intimate interface engagement as a unitized assembly with integral elements extending through the holes and intimately interlocking with the irregularities and intertices thereof whereby said laminates are unified and rigidified and said coil structure is supportable therein in insulated relationship from said sheet metal layers and with the walls of said recesses and said pole ends to hold the laminations and shrouds in integrally assembled relationship to provide structural strength to said stator;
   c. said cover structure including integral shroud members of said material having annular configurations extending longitudinally from opposite ends of each pole with at least the end portions of two of the shrouds diametrically opposite each other having inner surfaces radially outwardly a substantial distance from said cylindrical surface of revolution to receive in insulating supported relationship field coil turns under tension through the recesses and around the ends of the poles;
   d. a field coil received on the shrouds of each pole in which the turns of the field coils under their winding tension reposition at least said end portions of said two shrouds within said space outside said cylindrical surface of revolution to permit axial movement of a rotor therebetween, and store an elastic memory in the shrouds opposing said tension with the tension less on the inner turns than the tension on the outer and exposed turns.

2. A stator in accordance with claim 1 in which:
   a. said shroud members have integral arcuate transverse outer reinforcing shoulders ar their extended ends supporting the curvature of said shroud members at their ends to dispose said coil windings in place.

3. A stator in accordance with claim 1 in which:
   said cover structure elements and opposing arcuate shrouds conforming to the annular configuration of said pole ends at each end of said stator to receive in limited resilient supporting relationship the inner returning loops of said coil structure
   said pair of opposing arcuate shrouds provided at each end of said core structure presenting rounded surfaces of less width than the poles to resiliently engage in a radial direction said outer returning loops of said coil structure.

4. A stator in accordance with claim 1 in which:

a. said aligned holes are located at the base of the poles; and
b. said integral elements through said bore holes and said field coils cooperating to hold the laminations and shrouds in integrally assembled relationship.

5. A stator for a dynamo-electric machine comprising:
a. an annular paramagnetic field core structure adapted to receive a rotor therein;
b. said field core structure having a plurality of laminated sheet metal layers with internal recesses defining pole members and supporting surfaces adapted to receive field coil windings and having aligned bore holes in assembled condition;
c. a cover of insulating rigid, thermoplastic material molded in intimate interengagement with the interior and portions of the exterior of said field structure and having supporting end layers;
d. said cover including integral elements extending through said bore holes and through said recesses to join said end layers in unitary assembled relationship;
e. a pair of annular shroud members integral with said cover of plastic material and extending between said recesses outwardly from said end layers at each end of said field structure, said shrouds having transverse outer reinforcing shoulders at their extended ends; and
f. said shroud members being adapted to receive and support coil windings extending through said recesses and passing over the outer arcuate surfaces of one of said shroud members at each end of said stator and thereby being retained by said transverse shoulders.

6. A stator in accordance with claim 5 including:
a. a field coil wound about associated shroud members at opposite ends of said field structure said shrouds supporting the field coil thereon to receive the rotor therepast.

7. The combination called for in claim 6 in which said shrouds are depressed by and resiliently support the coil windings in place.

8. The combination called for in claim 7 in which tension on the inner windings of the coils is less than that maintained on the outer windings.

* * * * *